(12) United States Patent
Thrasher et al.

(10) Patent No.: US 6,579,549 B1
(45) Date of Patent: Jun. 17, 2003

(54) PACKAGED COOKED MEAT AND LOW PH SAUCE

(75) Inventors: Kent Thrasher, Sun Prairie, WI (US); Cory J. Painter, Cottage Grove, WI (US); Keena Brown, Madison, WI (US); Doris Ticknor, Fitchburg, WI (US); Jennifer Cuccia, Waunakee, WI (US)

(73) Assignee: Kraft Foods Holdings, Inc., Northfield, IL (US)

( * ) Notice: Subject to any disclaimer, the term of this patent is extended or adjusted under 35 U.S.C. 154(b) by 163 days.

(21) Appl. No.: 09/639,530

(22) Filed: Aug. 16, 2000

(51) Int. Cl.[7] ............ A23B 4/20; A23B 4/24; A23L 1/314
(52) U.S. Cl. ............ 426/124; 426/129; 426/326; 426/332; 426/399
(58) Field of Search ............ 426/124, 129, 426/92, 321, 323, 324, 326, 327, 332, 335, 264, 265, 281, 399

(56) References Cited

U.S. PATENT DOCUMENTS

| | | | |
|---|---|---|---|
| 2,933,399 A | | 4/1960 | Nickerson |
| 3,132,029 A | * | 5/1964 | Beck |
| 3,658,551 A | * | 4/1972 | Bundus et al. |
| 3,694,233 A | * | 9/1972 | Kaplow et al. |
| 3,852,486 A | * | 12/1974 | Walker et al. ............ 426/129 |
| 3,985,904 A | | 10/1976 | Bernotavicz ............ 426/332 |
| 4,075,357 A | | 2/1978 | Szczesniak et al. ............ 426/332 |
| 4,168,328 A | * | 9/1979 | Cheney et al. ............ 427/7 |
| 4,191,787 A | * | 3/1980 | Bauermann ............ 426/615 |
| 4,262,027 A | | 4/1981 | Tonner et al. ............ 426/325 |
| 4,597,974 A | * | 7/1986 | Fonteneau et al. ............ 426/129 |
| 4,612,203 A | * | 9/1986 | Wong et al. ............ 426/281 |
| 4,788,070 A | | 11/1988 | Brotsky et al. ............ 426/264 |
| 4,888,191 A | | 12/1989 | Anders et al. ............ 426/281 |
| 5,045,332 A | * | 9/1991 | Graf et al. ............ 426/332 |
| 5,219,603 A | | 6/1993 | Boudreaux et al. ............ 426/326 |
| 5,298,270 A | * | 3/1994 | Morgan ............ 426/234 |
| 5,780,085 A | | 7/1998 | Ruzek ............ 426/281 |
| 5,985,342 A | * | 11/1999 | Ruzek ............ 426/281 |
| 5,989,610 A | * | 11/1999 | Ruzek ............ 426/281 |
| 6,048,558 A | * | 4/2000 | Feldmeier et al. ............ 426/410 |
| 6,123,973 A | * | 9/2000 | Kuhn ............ 426/532 |
| 6,242,017 B1 | * | 6/2001 | Nauth et al. ............ 426/41 |

FOREIGN PATENT DOCUMENTS

JP 10-080262 * 3/1998

OTHER PUBLICATIONS

Millose, Red Arrow Products, Inc. (undated).
Chang, et al., "Lipid Oxidation in Pre–Cooked Beef Preserved by Refrigeration, Freezing, and Irradiation" *Food Technology* (Mar., 1961).
Van De Riet and Hard, "Flavor quality of anti–oxidant––treated, cooked, ground beef patties", *Journal of The American Dietetic Association*, vol. 75, (Nov. 1979).
Jakobsson and Bengtsson, "A Quality Comparison of Frozen and Refrigerated Cooked Sliced Beef", *Journal of Food Science, vol. 37,* (1972).

* cited by examiner

Primary Examiner—Milton I. Cano
Assistant Examiner—Robert A. Madsen
(74) Attorney, Agent, or Firm—Cook, Alex, McFarron, Manzo, Cummings & Mehler, Ltd.

(57) ABSTRACT

Control of the texture of meat cuts is accomplished so as to minimize the development of mealy, wet and soft texture of the meat cut, particularly when used in combination with a sauce having a relatively low pH of about 4.5 or below. The meat cuts are first fully cooked and chilled and then inserted, together with a low pH sauce, into a pouch and hermetically sealed within the pouch and stored under refrigerated, non-frozen conditions for at least 60 days without deterioration.

21 Claims, 3 Drawing Sheets

PACKAGED COOKED MEAT AND LOW PH SAUCE

BACKGROUND OF THE INVENTION

The invention generally relates to packaged precooked meat which is able to be stored under refrigerated conditions for extended time periods without developing a wet and soft texture, off-flavors, or undesired microbial growth. More particularly, the present invention relates to cooked meat cuts which are precooked and sealed into a pouch together with a low-pH sauce to provide a non-frozen packaged meat product having an extended refrigerated shelf life.

Methods and processes for packaging meat products in order to enhance their shelf stability are generally well-known. One category of providing shelf-stable packaged meat-containing products relies upon freezing those products with the objective of maintaining important flavor qualities and controlling microbial growth. Other approaches include packaging under aseptic conditions in the form of canned or retorted products or by using other technologies which tend to undesirably change the character of the meat products. There is a tendency for such products to lose their characteristic texture and to have their taste detrimentally affected. In general, meat freezing is still a preferred approach for long-term storage of meats and meat products. Freezing generally preserves flavor attributes and texture during reasonably long frozen storage periods.

In some instances, there is a desire to avoid frozen meat products for a variety of reasons. One may wish to avoid the time and inconvenience of having to proceed through a thawing operation. This is especially important in marketing meat products which are intended to exhibit a minimum of preparation time or to require minimal advance planning to allow for adequate defrosting time. Meat products which are marketed frozen can also give the impression of having a less fresh quality when compared with meat products which are available in a refrigerated, non-frozen state.

Refrigerated, non-frozen meat products are widely distributed in refrigerated food cases. Often, such products are in the nature of butchershop products which are pre-cut or pre-portioned and typically packaged in a simple manner suitable for self-serve refrigerated meat cases. These types of refrigerated meat cases are generally recognized as a fine source of so-called fresh meat products. The refrigerated shelf life of meat products marketed in this manner is necessarily relatively short and can require special handling and maintenance.

At times, meat products within refrigerated, non-freezing marketing display cabinets are of the pre-cooked variety. It has been found that pre-cooked meat products can be especially problematic in terms of maintaining flavor without developing characteristic and often unacceptable off-flavors. Refrigerated, non-frozen meat products likewise can be problematic in terms of microbial growth control. This is the case for even cooked meat products. In fact, cooked meat products are especially problematic when it comes to avoiding the development of off-flavors when stored under non-freezing refrigeration, even when that storage is for a relatively short time, for as short as a few days or even only several hours. Characteristic warmed-over flavors develop which render precooked meat products undesirable, even after they are heated during meal preparation.

Previous approaches recognize the importance of addressing these general concerns and problems. For example, Brotsky U.S. Pat. No. 4,788,070 describes meat emulsions including common salt and other components, which are then shaped and cooked, with attention being paid to low interior acid levels for meat products of this general type. This patent indicates the importance of rapid treatment of the meat particles in the emulsion, which are to be of a size smaller than meat cubes of intact muscle. Tonner U.S. Pat. No. 4,262,027 relates to ground meat with an acid source having a slow release characteristic which will acidify after heating is initiated. Bernatovicz U.S. Pat. No. 3,985,904 relates to ground meat products having fillers. The use of citric acid in cooked ground meat products is discussed.

Other approaches address meat cuts which are not necessarily processed as ground products. Szczesniak U.S. Pat. No. 4,075,357 relates to intermediate moisture meats having a preservation system including a common chloride salt with certain organic salts, while recognizing that it can be useful to lower the pH of meats from the near-neutral range of from 5.5 to 8.0 down to a pH of as low as 3.0 by the use of food grade acids. Anders U.S. Pat. No. 4,888,191 recognized that *Clostridium botulinum* can be addressed in fish and poultry through the use of lactate salts, either alone or combined with agents such as sodium chloride or sodium nitrite. Included are turkey breasts injected with a brine solution, as well as the lactate salt. Ruzek U.S. Pat. No. 5,780,085 describes treating fresh pork cuts with a treatment solution having a lactate buffer salt, a phosphate sequestrate, and a diacetate flavor enhancement agent.

Although approaches such as these have been suggested, satisfactory industrially prepared and packaged cooked meat cuts in sauces have not been available in a form which achieves extended shelf life attributes even when stored under refrigerated, non-frozen conditions. Thus, there is a potentially important category of food products which are convenient to distribute industrially and market, while also requiring a minimum amount of consumer preparation. This potentially important category relates to meat products which are quick and easy to prepare, typically being eaten after a brief heating period, such as by microwave heating close in time to consumption. More particularly, this category preferably includes precooked, uncured meat cuts. A primary reason for the rarity of refrigerated, precooked and uncured meat cuts being available to consumers through retail markets is the sususptiblity of such meat components to decline in meat quality during long-term refrigerated storage.

In this regard, meat quality decline can involve three principal aspects. Microbial quality typically deteriorates under refrigeration, especially under conditions at which the cooked cut is neither frozen nor cured. Psychorotropic bacteria can multiply during refrigerated storage and reduce acceptable shelf life of the meat.

Another aspect of meat quality deterioration, which is of particular concern when cooked and uncured meat products are refrigerated, particularly above meat-freezing temperatures, is flavor quality deterioration. Maintenance of acceptable flavor of cooked, uncured meat is challenged by the rapid onset of off-flavors, which can be known in the art as "warmed-over flavor" (at times referred to herein as "WOF"). The development of these types of off-flavors typically occurs within hours of cooking. Consequently, consumer acceptability of precooked, uncured meat products declines very rapidly with the length of storage time. It is generally accepted that the WOF phenominum is caused by autoxidation of meat lipids. WOF characteristics generally are associated with the characteristics of oxidative rancidity. At a minimum, unpleasant flavor notes develop in short order when precooked meat cuts are wrapped and refrigerated.

A third meat quality deterioration can occur when providing meat cuts which are flavored or which are otherwise treated with relatively low pH compositions. It has been found that precooked products within this general category can be faced with a problem of excess tenderness or a mealy feel and appearance, thereby providing a product which is not of a satisfactory texture characteristic of a freshly cooked meat cut. It is believed that this disagreeable characteristic is due to a reduction in the water holding capacity of the cooked meat. This water holding capacity reduction is believed to lead to water purge and resulting yield loss, as well as the mealy and soft, tending toward slimy feel and appearance of such packaged precooked meat cuts. It is generally believed that cooking with a low pH sauce or component moves the meat to near or at its isoelectric point. Meat pH reduction which occurs prior to cooking reduces water holding capacity of the meat, causes it to lose water and thus yield.

These detrimental microbial, flavor and texture characteristics become more problematic during non-freezing refrigerated storage for extended time periods. To provide precooked meat products, particularly ones which are flavored, the avoidance of texture degradation, oxidative rancidity, significant bacterial count increases, and off-flavor development must be avoided or substantially retarded so as to provide cooked meat products or meat-containing products which are both safe and acceptably flavored.

SUMMARY OF THE INVENTION

The present invention is directed to a refrigerated packaged food product and process for preparing the food product. Meat cuts are processed and packaged with a selection from a variety of sauces and to provide precooked meat cuts in sauces in a form which has an extended shelf life of months for meat cuts which exhibit and maintain control of microbial growth and avoid mealy, wetter and softer texture characteristics, while maintaining good flavor attributes and retarding warmed over flavor development. Unfrozen meat cuts are treated with a marinade, followed by cooking and chilling. Thereafter, the cooked, uncured cuts are placed into a pouch, together with a low pH sauce, which pouch is then sealed and placed into a refrigerated, non-frozen environment. The product is marketed and sold. In a preferred embodiment, the pouch containing the food product is placed within a tray which is also sealed and part of the refrigerated package.

It is accordingly a general object of the present invention to preserve precooked meat cuts for long term refrigerated storage.

Another aspect of the present invention is to provide improved precooked and uncured meat products, processes for preparing and using same, and kits incorporating same, which meat products retard microbial growth, off-flavor development, and mealy characteristics.

Another aspect of this invention is to provide refrigerated, never frozen, precooked and uncured meat cuts in a form suitable for sale to consumers through retail markets by imparting microbial and flavor shelf-stability for lengths of time suitable for retail markets and channels of trade and without causing water transfer out of the meat, which would result in mealy, wet texture and yield loss.

Another aspect of the present invention is to combine formulation, processing and packaging features in preparing cooked meat products having a shelf life of at least 60 days, the formulation features including treatment with a marinade, and the processing including full cooking prior to the addition of an acidic sauce.

Another aspect of this invention is to provide non-frozen whole muscle meat cuts or portions which, although unground, maintain long-term shelf stability and flavor maintenance and texture maintenance without subjecting same to freezing.

In another aspect of the invention, a marinade formulation including a lactate, a phosphate, and a common salt treats an unfrozen meat cut prior to searing, cooking and chilling, done prior to the addition of any low pH sauce for contact with the meat.

These and other objects, aspects, features and advantages of the present invention will be apparent from and clearly understood through a consideration of the following detailed description.

BRIEF DESCRIPTION OF THE DRAWINGS

In the course of this description, reference will be made to the attached drawings, wherein.

DESCRIPTION OF THE PREFERRED EMBODIMENTS

Figure 1:
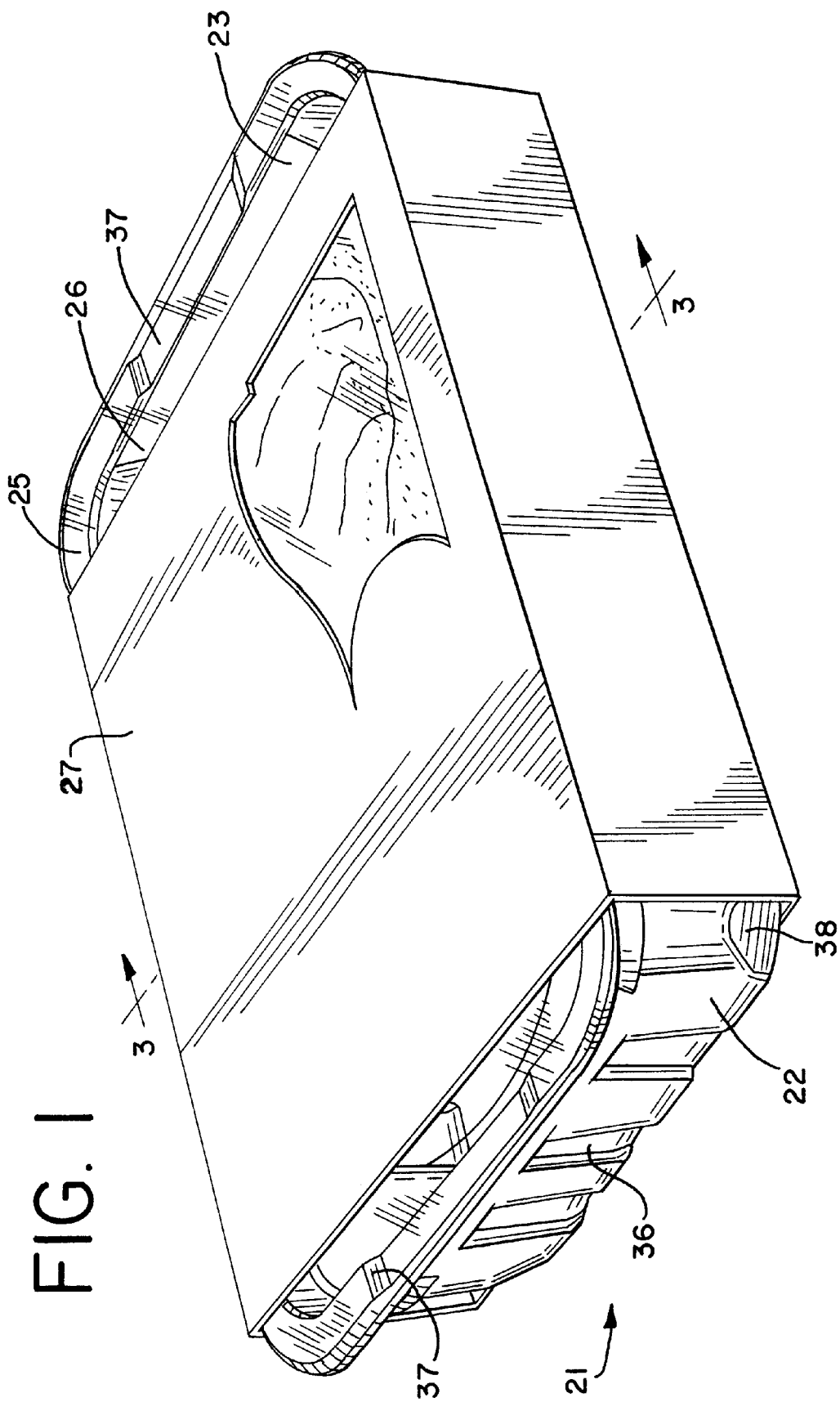
FIG. 1 is a top perspective view of packaged treated meat cuts and sauce according to an embodiment of the invention.

Originating meat cuts according to the invention are most advantageously from poultry sources, including chicken, turkey and other foul. White meat cuts are especially advantageous meat cut sources. Examples include breast fillets, strips and portions, including pre-severed strips and chunks. The invention finds particularly useful application when the originating meat cuts have length or width dimensions of at least one inch (2.54 cm).

When there is a desire to practice the invention with other originating meat sources, such sources also can be suitable for use. Other meats include pork, beef and lamb sources. The invention currently has especially useful commercial application for poultry originating meat cuts. This being the case, special emphasis is placed herein on poultry cuts in general and chicken cuts in particular.

Another important advantage of the invention is that the meat cuts can originate from never frozen sources. Typically, the sources will be whole muscle pieces or portions. To the extent that unfrozen food supplies are readily available at a commercially acceptable cost, the meat sources themselves will be of the fresh variety. Thus, the meat cuts are not cured, either before, during or after processing according to the invention. The invention is particularly unique in its ability to improve the shelf stability, flavor stability and texture maintenance of meat cuts which are not ground or comminuted sources. Whatever the ultimate origin of the meat cuts, they will begin the process as unfrozen cuts.

In proceeding with the processing, these unfrozen meat cuts are treated with a marinade which has been found to be especially suitable when used in combination with the other major features of the process. The marinade treatment is carried out in accordance with acceptable food-processing procedures. These include tumbling and contacting the surfaces of the meat cuts with the marinade. The length of treating or contacting should be adequate such that the components of the marinade penetrate into and typically through the external surfaces of the meat cuts. An important objective of this treatment is to have the marinade components remain with the meat cuts during subsequent treatment, especially during the cooking operation.

A preferred marinade formulation is comprised of one or more lactate salts, a diacetate salt, and a common inorganic salt. This is an aqueous composition, and typically the majority of the marinade is water. Another component which can be included is a phosphate salt or complex phosphate salt. While not an essential component, flavoring agents can be included, such as chicken flavor, as can be binding agents or sweetening agents, an example of other possible agents being dextrose.

The lactate salts usually comprise-either or both of sodium lactate and potassium lactate. Because many lactate products are available as a syrup, this form of lactate addition typically is practiced. A typical syrup will be a 60 percent solution of the lactate salt within water. The lactate will be present in the marinade at levels of between 0.01 weight percent and up to the legal limit for lactate in meat products, which is 4.8 weight percent. These percentages are based upon the total weight of the meat cuts and the marinade. When considered in terms of the marinade itself, the lactate can be present at a level of between about 0.06 weight percent and about 28.8 weight percent. Preferably, the amount of lactate is between about 1.5 and about 3 weight percent, based upon the total weight of the meat and marinade. This is between about 9 and 18 weight percent, based upon the total weight of the marinade.

Diacetate salt levels are between about 0.01 weight percent and up to the legal limit of a diacetate in meat products, namely 0.25 weight percent. These are based upon the weight of the total meat and marinade composition. When considered in terms of the marinade alone, the diacetate component is present at a level of between about 0.06 weight percent and about 1.5 weight percent. For a typical diacetate component such as sodium diacetate, the preferred range for this component is between about 0.05 and about 0.2 weight percent, based upon the total weight of the meat and marinade. Based upon the total weight of the marinade itself, the preferred level is between about 0.3 and about 1.2 weight percent.

Suitable inorganic salts are typically sodium chloride, potassium chloride and the like, generally identified herein as common inorganic salts. The common inorganic salt component is present at a level of between about 0.01 and about 3 weight percent, based upon the total weight of the meat and marinade. Based upon the weight of the marinade alone these levels are between about 0.06 and about 18 weight percent. Preferably, the common organic salt component is present at between about 0.75 and about 1.5 weight percent, based upon the total weight of the meat and marinade. Based upon the weight of the marinade alone, the common inorganic salt component is present at between about 4.5 and about 9 weight percent.

A typical marinade will have a water content of between about 8 and 20 weight percent, based upon the total weight of the meat and marinade. When considered in terms based on the weight of the marinade only, water is present at between about 50 and about 85 weight percent. It will be appreciated that some of the water content can be contributed by other components, most notably by the lactate syrup component. Preferred water ranges are between about 10 and about 15 weight percent, based upon the total weight of the meat and marinade. Based upon the weight of the marinade only, water ranges between about 55 and about 80 weight percent.

The marinade compositions can include a phosphate salt, often a complex phosphate salt. When this phosphate component is a compound such as sodium tripolyphosphate, this component will be present at a level of between about 0.1 and about 2 weight percent. This is based upon the total weight of the meat and marinade. Based upon the weight of the marinade alone, this phosphate component would be present at levels of between about 0.6 and about 12 weight percent. Preferably, when present, the phosphate component will be at a level of between about 0.2 and about 1 weight percent, based upon the total weight of meat and marinade. Based upon the weight of the marinade alone, this component would be present at between about 1.2 and about 6 weight percent.

Other components can be included. A typical flavoring component or combination of flavoring components can be present at between about 0.5 and about 3 weight percent, based upon the total weight of the meat and marinade. When based upon the weight of the marinade alone, this will be between about 3 and about 18 weight percent. Other additives, such as humectints, thickeners, sweetening agents and the like can be present. An example of an additional ingredient is dextrose. When present, levels are between about 0.1 and about 2 weight percent, based upon the weight of the meat and marinade, or between about 0.6 and about 12 weight percent based upon the weight of the marinade only.

The marinade will be combined with the meat cuts at suitable levels so as to achieve the needed marinating function. At this stage of the process, the marinade will comprise between about 10 and about 25 weight percent, while the meat cuts will comprise between about 75 and about 90 weight percent of the total meat and marinade composition within the mixture added to the mixing container.

Before cooking the marinated meat cuts, they can be treated with a caramel component or formulation. A commercially available formulation which is suitable in this regard is Maillose®, of Red Arrow Products Co., Inc. This formulation is an aqueous solution of caramel coloring produced according to food regulations. Usage levels can vary between about 0.3 and about 3 weight percent, based upon the weight of the marinated meat cuts. Typically, this component will be applied as a solution (such as for spraying) having a ratio of 2:1 of Maillose: water.

Whether or not thus additionally treated, the marinated meat cuts are cooked. Preferably, the cooking includes an initial high-heat searing of the meat cuts. Cooking will proceed thereafter so as to achieve full cook characteristics as required by food processing regulations. The searing operation is done rapidly and at high temperature so as to provide a denatured protein skin barrier. This has been found to assist in reducing water transfer out of the meat. Full cooking is typically indicated when the internal temperature of the meat reaches 155° F. or higher (68.3° C.). Any industrial oven, such as one suitable for industrial flow-through cooking, can be used.

The cooked meat cuts are subjected to chilling in accordance with procedures suitable for industrial handling of meat products. For example, a spiral freezer will chill fully cooked chicken fillets down to about 27° F. (−2.8° C.) in about one half an hour. Cooling is accomplished in accordance with controlling governmental regulations. The chilling does not freeze the meat, although a so-called crusting can take place. The objective of the chilling step is not to freeze the meat cuts, but to rapidly chill in accordance with good meat handling practices.

The precooked and thus chilled meat cuts are next to combined with a low pH sauce. The sauce provides a variety of flavors to the meat cuts, depending upon the particular product being prepared. These can be, for example, barbecue flavored, teriyaki flavored, garlic flavored, herb flavored, either alone or combined with other flavorings such as lemon or citrus, pepper, with the like. A principal feature of the sauce is that it has a low pH, meaning a pH of below about 4.5, typically of about 4.2 or below, preferably of about 4.0 or below. This is the pH of the sauce prior to its addition to the fully cooked meat cuts. This low pH characteristic is provided by including a food grade acid within the sauce. Often, this is achieved by having vinegar within the sauce. A typical vinegar includes acetic acid. An example of a vinegar which is instrumental in providing an adequately low pH to such sauces is 120 grain vinegar. Many suitable sauces will have a pH of 4.1 or below. Other suitable sauces will have a pH of 3.8 or below. Some can have a pH of 3.5 or below. A typical pH range for the sauce prior to its addition to the meat cuts is 2.5 to 4.2. A preferred range is 3 to 4.0. Another preferred range is 3 to 3.5 pH.

A typical low pH sauce will include between about 40 weight percent and about 65 weight percent water, based upon the total weight of the sauce. Typical sauce water activities will be on the order of about 0.92 or lower. Generally, beneficial effects according to the invention will be achieved by low pH sauces having a low water activity. Broadly, sauce water activity will be below 0.92. Some sauce water activities will be at about 0.9 or below. An advantageous common inorganic salt level is between about 2 and about 3 weight percent, based on the total weight of the sauce. It will be especially advantageous to have sauces with a combination of these pH values, water activities and salt levels.

Various low pH sauces are available commercially. Examples include Kraft® Honey Hickory BBQ sauce, Bulls-Eye® teriyaki sauce, McCormick® Golden Dip teriyaki sauce, sauce formulations including flavoring from Firmenich®, Bulls-Eye® garlic herb grilling sauce, lemon pepper flavored sauces, as well as various other commercially available sauces or other sauces formulated to have the desired flavor, while exhibiting the requisite low pH. A typical sauce formulation will include water, vinegar, starch, vegetable oil, flavoring, sweetener, gums and other typical sauce formulation components.

Adding the low pH sauce to the fully cooked product is an important feature of the process. Especially suitable in this regard is adding the low pH sauce to the cooked and chilled meat cuts shortly before hermetic packaging together of the cooked meat cuts and low pH sauce. It will be appreciated that the cooked meat pieces most often will have a pH considerably higher than that of the sauce with which they are combined. Such combined pH values will be on the order of about 5 to about 6.3 once a generally equilibrated condition is reached. To a limited extent, the low pH value required of the sauce will depend somewhat upon the condition of the meat cuts prior to the combining step. Examples of relevant meat condition factors are pH, microbial activity, temperature and the like. For most meat cuts, the sauce pH values of the sauces noted herein will be adequate. It is also preferred that the temperature of the sauce be on the order of that of the cooked and chilled meat cuts, typically at or below 40° F. (4° C.).

It is preferred in that the hermetic sealing together of the fully cooked meat cuts and the low pH sauce will be under so-called vacuum conditions. Packaging can be carried out on commercially available form, fill and seal equipment, or simply within suitable vacuum packaging commercial equipment. When equipment is used which incorporates a forming operation, usually both a forming film and a non-forming film will be used. A suitable forming film is a Curlon® forming film available from Curwood, a preferred example being Curlon 1251. A typically suitable non-forming film is Curlon 1915G. Preferably, the hermetically sealed pouch has a peelable seal, such as one provided by an adhesive, by mating strips, and the like. Typical peel adhesive formulations also are available from Curwood. In one aspect of the invention, the thus vacuum packaged fully cooked meat cuts and low pH sauce are ready for entering commercial distribution channels. The invention permits the equipment of these distribution channels and the cases of the marketing and sales channels to be refrigerated and not frozen. This allows the provision of unfrozen meat cuts which are ready to use, with or without heating. Typically, however, the meat cuts will be heated, such as in a consumer microwave oven, prior to cooking, whether with the sauce or without.

Another aspect of the packaging which can be used in connection with the fully cooked meat cuts and low pH sauce is to provide a protective tray within which the hermetically sealed pouch is placed. This protective tray physically protects the hermetically sealed pouch, both from unintentional damage and potentially intentional tampering. The tray, which itself includes a sealing lid, also provides assistance in maintaining the refrigerated temperature in storage. There will be "dead air" or gas space, often merely air space, between the outside of the pouch and the interior surface of the tray. Once chilled, this gas provides an additional buffer or sink for maintaining a desired refrigerated, non-frozen temperature.

The tray also can provide the function of a convenient cooking tray during microwave heating of the food product prior to consumption. With this approach, the food product, whether only the cooked meat cuts or the cuts within the low pH sauce, will be opened, and the contents poured in the tray, while its lid is peeled back, opened or removed.

Refrigerated temperatures for the products are consistent with those provided in wholesale storage and transportation facilities and vehicles. They also will be in accordance with temperatures and air flow conditions of refrigerated retail storage cases. Generally speaking, these refrigerated conditions are such that the packaged products remain unfrozen. A typical refrigerated temperature is between about 32° F. (0° C.) and about 44° F. (7° C.), typically on the order of about 40° F. (4.4° C.).

Figure 2:
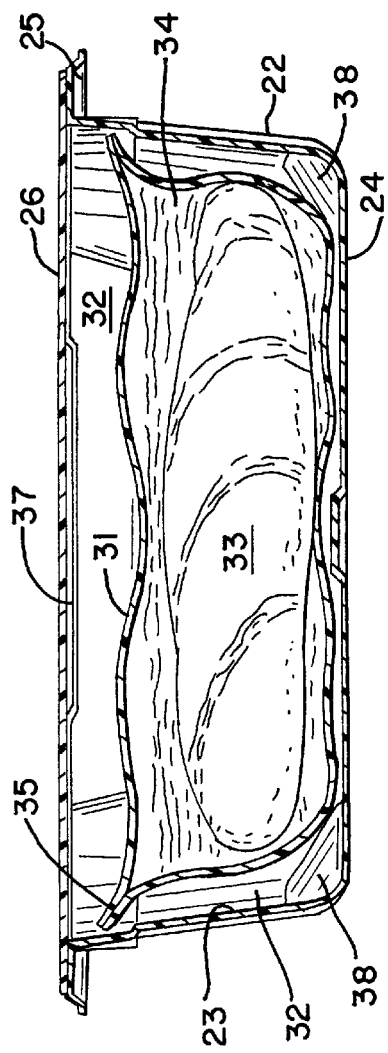
FIG. 2 is a cross-sectional view along the line 2—2 of FIG. 1.
Figure 4:
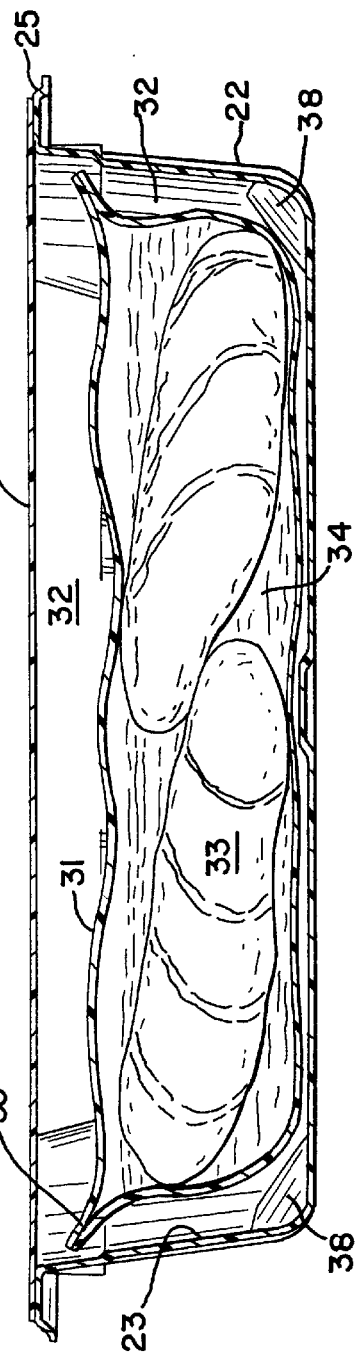
FIG. 4 is a cross-sectional view along the line 4—4 of FIG. 3.
Figure 5:
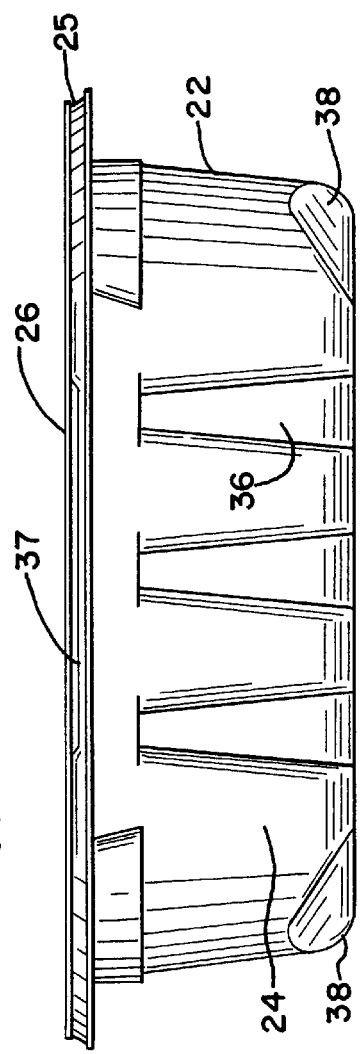
FIG. 5 is an end view of the tray illustrated.
Figure 3:
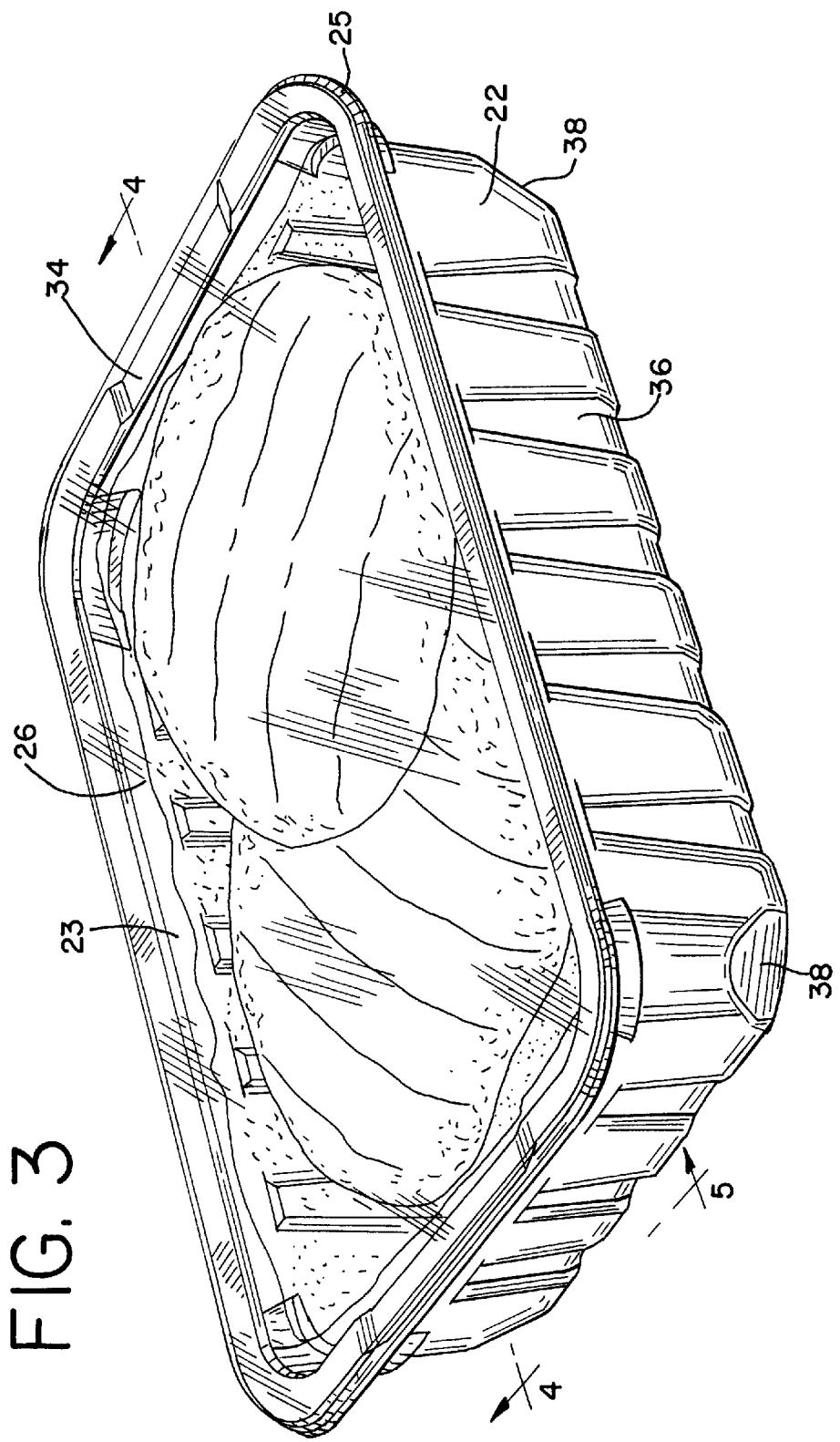
FIG. 3 is a top perspective view of the packaged product as generally shown in FIG. 1, but with the over sleeve removed and the tray opened.

With particular reference to the food packaging which is illustrated, FIG. 1 through FIG. 5 generally show at 21 a refrigerated packaged food product. Included is a tray 22 having an internal volume defined by a sidewall 23 and a bottom wall 24. Sidewall 23 can include ridges 36 for added rigidity of the tray. Sidewall 23 includes an annular rim 25. Closure of the tray in this illustrated embodiment is accomplished by a lid 26. A typical lid is a polymeric lidding sheet which is flexible and releaseably sealed to the annular rim 25. In the illustrated embodiment, a sleeve 27 provides added mechanical protection and barrier properties, for example reducing photo-oxidation. Sleeve 27 also provides a convenient means for packaging graphics. The tray and sleeve, as well as the sealed lid and the oxygen barrier pouch reduce oxygen penetration and exposure of the food.

Positioned within the volume of the tray and between the tray and the lid is a pouch 31 containing the food product. It will be noted that, even with the pouch within the tray sealed by the lid, free space 32 remains. This free space provides an opportunity for gas, typically, air, to provide a sink or buffer volume as generally discussed herein.

Pouch 31 includes fully cooked meat cuts 33 and a low pH sauce 34. Preferably, the pouch is vacuum sealed and securely closed by suitable conventional approaches. Sealing may be accomplished by an adhesive, especially a peelable adhesive, or by suitable mechanical arrangements. An interlocking seal strip arrangement 35 is suitable in this regard.

In use, the combined meat cuts and sauce remain hermetically sealed and refrigerated within the pouch until such time as heating and serving are desired. At that time, the seal 35 is broken, the pouch is opened, and the meat cuts and sauce are removed from the pouch. They can be placed within a suitable heating container. If desired, only the meat cuts can be heated for serving, when it is desired to not utilize the combination of sauce and meat. It has been found that the sauce flavor is delivered to the meat cuts in their mutual chilled environment, and the sauce flavor is evident in the meat cuts even after washed from the surfaces of the cooked meat cuts which had been refrigerated with the sauce.

In the illustrated kit embodiment, the tray 22 serves well as a heating container for heating within a microwave oven, for example. In that instance, the desired content from the pouch is emptied into the tray. If desired, the lid 26 can be re-positioned onto the annular rim 25 for spattering protection and heat maintenance in accordance with typical microwave heating practice. In that instance, annular rim 25 includes a depression 37 to facilitate venting when the lid is secured to the annular rim, including during re-heating.

When the tray is used as a container for heating the edible contents, it preferably includes ramped corners 38 to facilitate movement of the sauce away from the bottom corners of the tray and towards the center of the tray. These slanted corner ramps also increase corner strength. When the tray component is provided, it preferably is made of a high performance polymer which will withstand household microwave heating, as well as show resistance to damage during storage, transport, display and general handling. A suitable material is a blended copolymer and homopolymer of polypropylene. Polymers of this type are available from Curwood.

Exemplary illustrations of the disclosure herein are provided in the following examples.

EXAMPLE 1

Chicken breast fillets were treated with a marinade according to the invention and were seared on both sides. They were thereafter sprayed with a 2:1 Maillose:water solution. These fillets were placed in a combination oven which was set on heat plus steam at 400° F. (204° C.). The fillets reached an internal temperature of at least 160° F. (71° C.) and then chilled. The cooked fillets were packaged in vacuum pouches with three different sauces. Several packages contained Kraft® honey hickory barbecue sauce (pH of 3.2). Several other pouches contained McCormick® golden dip teriyaki sauce (pH of 4.2). After six days storage under refrigerated, non-frozen conditions, the fillets were removed from the pouches. In order to evaluate transfer of flavor from the sauce to the cooked fillets, all of the sauces were removed from the fillets, and the fillets were rinsed with tap water. These fillets were heated and tasted. In each instance, the tasting indicated that each sauce flavor was delivered to the fully cooked fillet within the refrigerated environment provided by the pouch under refrigeration. No adverse texture problems were observed, there being no indication of a mealy, wet or soft texture or consistency.

EXAMPLE 2

A marinade was prepared and combined with chicken breast fillets. The weight percents of the components were as follows, each percent being based upon the total weight of the chicken breast fillets and the marinade components: chicken breast fillets 83.33 percent; water 9.92 percent; chicken flavoring 1.25 percent; sodium lactate 2.45 percent; potassium lactate 1.00 percent; sodium chloride salt 1.10 percent; dextrose 0.51 percent; sodium tripolyphosphate 0.334 percent; and sodium diacitate 0.10 percent. These were 4 ounce fillets, and the marinated fillets were cooked and chilled. The chilled yield average was observed to be 77.1 weight percent. Cooking of a group of these fillets was done within a Progrill® system at 345° F. (174° C.) for 65 seconds, creating a seared protein skin of the fillets. These were passed to a combination oven for a cook time of about 4 minutes at 500° F. (260° C.), under steam at about 600 pounds per hour. Grill marks were imparted to the fillets by a charring device. Average cooked yield was 82.6 weight percent (standard deviation 0.73 percent). After chilling, the cooked and chilled fillets had an average yield of 77.08 weight percent (standard deviation 0.94 percent).

EXAMPLE 3

Fillets were marinated substantially in accordance with Example 2, cooked and chilled. These were combined with one of three different sauces, a Kraft® honey hickory barbecue sauce at a pH of 3.2, and a teriyaki sauce at a pH of 4.2. They were vacuum packaged in pouches and stored under refrigeration for three months. Other pouches were control products which were identical except no sauce was added prior to vacuum packaging. The control fillets showed an increase in microbial activity from 4 weeks through to 10 weeks of refrigerated, vacuum sealed storage. The increase was from one Log CFU/gm at 4 weeks, 2.5 Log CFU/gm at 8 weeks, and 3 Log CFU/gm at 10 weeks. The teriyaki sauce treated fillets were at about one Log CFU/gm at 4 weeks, and remained at that level, both at 8 weeks and 10 weeks. The low pH barbecue sauce treated fillets were at about 1 Log CFU/gm at 4 weeks, and were at about the same value at 8 weeks and at 10 weeks. The three low pH sauces had less then 10 col. after 10 to 13 weeks.

EXAMPLE 4

A marinade formulation was prepared as follows: 70.07 weight percent water, 14.70 weight percent sodium lactate, 6 weight percent potassium lactate, 6.6 weight percent sodium chloride, 2 weight percent sodium tripolyphosphate, and 0.6 weight percent sodium diacetate, each being based upon the total weight of the marinade. This marinade was vacuum tumbled with chicken breast fillets at a weight ratio of 5:1 of fillets:marinade. These fillets were seared and cooked until the internal temperature was about 160° F. (71° C.). The fillets were cooled and packaged with a variety of low pH sauces. These sauces included Kraft® honey hickory sauce at a pH of 3.27, Bulls-Eye® teriyaki grilling sauce having a pH of 3.8, Bulls-Eye® garlic herb grilling sauce, McCormick® golden dip teriyaki sauce having a pH of 4.2, and a formulated lemon pepper sauce having a pH of 3.3.

After sauce and cooked fillet composites were vacuum packaged together, the following pH readings were noted: Kraft® honey hickory barbecue sauce and cooked fillets, 5.47 pH; Bulls-Eye® garlic herb grilling sauce and cooked fillets, 6 pH; and McCormick® golden dip teriyaki sauce with cooked fillets, 5.5 pH. The fillets were observed to be devoid of any visible mealy, wet or soft texture.

EXAMPLE 5

Uncooked chicken strips were treated with a marinade together with a teriyaki flavor, such being a low pH treatment prior to cooking. After cooking and chilling, the chicken cuts were observed to have a mealy, wetter and softer texture than before cooking. Removing the low pH teriyaki prior to cooking, and moving it to addition promptly after cooking and chilling avoided these negative developments. Chicken cuts having the low pH sauce added after cooking resulted in little, if any detrimental affects to the texture.

It will be understand that the embodiments of the present invention which have been described are illustrative of some of the applications of the principles of the present invention. Numerous modifications may be made by those skilled in the art without departing from the true spirit and scope of the invention.

What is claimed is:

1. A process for preparing a non-frozen, uncured packaged meat product having an extended refrigerated shelf life in which texture degradation, oxidative rancidity and off flavor development, and microbial activity are substantially retarded, comprising:
    selecting an uncooked, uncured meat cut having an outer surface;
    treating the uncooked, uncured meat cut with a marinade containing an organic salt, a lactate salt and a diacetate salt;
    searing a substantial portion of said outer surface of the meat cut, and cooking the meat cut to provide a cooked meat cut having an internal temperature of at least 155° F. (68° C.);
    cooling said cooked meat cut to below room temperature and without internally freezing the cooked meat cut;
    placing the thus cooled cooked meat cut into a pouch, and placing a low pH sauce into said pouch, said sauce having a pH of less than about 4.5;
    sealing the pouch with the cooked meat cut and the low pH sauce therewithin to provide a sealed pouch containing the cooked meat and low pH sauce; and
    marketing said sealed pouch having the cooked meat cut and low pH sauce in a refrigerated, non-frozen condition, said cooked meat cut and sauce having said extended refrigerated shelf life.

2. The process in accordance with claim 1, wherein said placing includes sauce having a pH of 4.2 or lower.

3. The process in accordance with claim 1, wherein said placing includes sauce having a pH of 4.0 or lower.

4. The process in accordance with claim 1, wherein said placing includes sauce having a pH of 3.8 or lower.

5. The process in accordance with claim 1, further including adding a caramel composition to said outer surface of the meat cut before completion of the cooking operation.

6. The process in accordance with claim 1, wherein said treating with a marinade includes treating with a phosphate salt.

7. The process in accordance with claim 1, wherein said extended refrigerated shelf life of said marketing is at least 60 days.

8. The process in accordance with claim 1, wherein said extended refrigerated shelf life of said marketing is at least 90 days.

9. The process in accordance with claim 1, wherein said selecting is of uncooked meat cuts having a length no less than one inch (2.54 cm).

10. The process in accordance with claim 1, wherein said selecting is of meat cuts of poultry whole muscle.

11. The process in accordance with claim 1, wherein said placing includes sauce having a water activity of about 0.92 or below.

12. The process in accordance with claim 2, wherein said placing includes sauce having a water activity of about 0.92 or below.

13. The process in accordance with claim 1, wherein said placing includes sauce having a water activity of about 0.9 or below.

14. A process for preparing a non-frozen, uncured packaged meat product having an extended refrigerated shelf life in which texture degradation, oxidative rancidity and off-flavor development, and microbial activity are substantially retarded, comprising:
    selecting an uncooked, uncured meat cut having an outer surface;
    treating the uncooked, uncured meat cut with a marinade containing an organic salt, a lactate salt and a diacetate salt;
    searing a substantial portion of said outer surface of the meat cut, and cooking the meat cut to provide a cooked meat cut having an internal temperature of at least 155° F. (68° C.);
    cooling said cooked meat cut to below room temperature and without internally freezing the cooked meat cut;
    placing the thus cooled cooked meat cut into a pouch, and placing a low pH sauce into said pouch, said sauce having a pH of 4.5 or lower;
    sealing the pouch with the cooked meat cut and the low pH sauce therewithin to provide a sealed pouch containing the cooked meat cut and low pH sauce;
    providing a tray sized to accommodate said sealed pouch having the cooked meat cut and low pH sauce, and inserting said sealed pouch into said tray;
    closing said tray so as to seal said pouch therewithin to provide a packaged cooked meat cut and sauce product; and
    marketing said packaged cooked meat cut and sauce product in a refrigerated, non-frozen condition, said packaged cooked meat cut and sauce product having said extended refrigerated shelf life.

15. The process in accordance with claim 14, further including adding a sleeve over at least a portion of said packaged cooked meat cut and sauce to provide a sleeved packaged meat product as the packaged meat product having an extended refrigerated shelf life.

16. The process in accordance with claim 14, wherein said tray has an internal volume which is sized in a manner to provide gas space between said sealed pouch and said tray.

17. The process in accordance with claim 14, wherein said placing includes sauce having a pH of 4.0 or lower.

18. The process in accordance with claim 14, further including adding a caramel composition to said outer surface of the meat cut before completion of the cooking operation.

19. The process in accordance with claim 14, wherein said extended refrigerated shelf life of said marketing is at least 60 days.

20. The process in accordance with claim 14, wherein said selecting is of uncooked meat cuts having a length no less than one inch (2.54 cm).

21. The process in accordance with claim 14, wherein said selecting is of meat cuts of poultry whole muscle.

* * * * *

UNITED STATES PATENT AND TRADEMARK OFFICE
CERTIFICATE OF CORRECTION

PATENT NO.    : 6,579,549 B1
DATED         : June 17, 2003
INVENTOR(S)   : Kent Thrasher et al.

It is certified that error appears in the above-identified patent and that said Letters Patent is hereby corrected as shown below:

Title page and Column 1, Line 1,
Item [54], delete "PH" and insert -- pH --.

Column 2,
Line 62, delete "phenominum" insert -- phenomenom --.

Column 5,
Line 17, delete "comprise-either" insert -- comprise either --

Column 6,
Line 25, delete "humectints" insert -- humectants --.

Column 7,
Line 6, after "next" delete "to".
Line 12, delete "with" and insert -- and --.

Column 10,
Line 17, delete "diacitate" insert -- diacetate --.
Line 50, delete "then" insert -- than --.

Signed and Sealed this

Third Day of August, 2004

JON W. DUDAS
*Acting Director of the United States Patent and Trademark Office*